(12) United States Patent
Bock et al.

(10) Patent No.: US 6,748,135 B2
(45) Date of Patent: Jun. 8, 2004

(54) METHOD FOR DETERMINING INTERACTIONS BETWEEN A NUMBER OF OPTICAL CHANNELS IN A WAVELENGTH DIVISION MULTIPLEXED SIGNAL

(75) Inventors: Harald Bock, Augsburg (DE); Andreas Faerbert, Munich (DE); Joerg-Peter Elbers, Munich (DE); Christian Scheerer, Ottawa (CA)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 10/091,241

(22) Filed: Mar. 5, 2002

(65) Prior Publication Data

US 2002/0145777 A1 Oct. 10, 2002

(30) Foreign Application Priority Data

Mar. 2, 2001 (DE) .......................................... 101 10 270

(51) Int. Cl.$^7$ .................................................. G02B 6/28
(52) U.S. Cl. ............................. 385/24; 398/34; 398/27; 398/29; 398/81; 398/148; 398/193
(58) Field of Search ............................... 385/24; 398/34, 398/27, 29, 81, 148, 193

(56) References Cited

U.S. PATENT DOCUMENTS 6,452,707 B1 * 9/2002 Puc et al. .................... 398/158

OTHER PUBLICATIONS

Agrawal, Fiber–Optic Communication System, Second Edition, pp. 323–328.

Kaminow et al., "Optical Fiber Communications", IIIA, pp. 316–334.

* cited by examiner

Primary Examiner—John D. Lee
Assistant Examiner—Eric Wong
(74) Attorney, Agent, or Firm—Bell Boyd & Lloyd LLC

(57) ABSTRACT

A method for determining interactions between a number of optical channels in a wavelength division multiplexed signal wherein, given that during broadband optical transmission, the quality of a "Dense Wavelength Division Multiplexed" signal is adversely affected by multiple channel interactions, the method is used to determine the governing effects, the Kerr effect and the non-linear scattering process by evaluating the spectral profile of the Q factor or of the bit error rate.

10 Claims, 2 Drawing Sheets

METHOD FOR DETERMINING INTERACTIONS BETWEEN A NUMBER OF OPTICAL CHANNELS IN A WAVELENGTH DIVISION MULTIPLEXED SIGNAL

BACKGROUND OF THE INVENTION

The present invention relates to a method for determining interactions between a number of optical channels during optical wavelength division multiplexed (WDM) transmission.

Non-linear interference occurs when transmitting WDM signals through optical fibers. In an optical transmission system, these effects must be determined and, in addition, must be minimized. Methods to measure the quality characteristics of a signal have been developed for this purpose.

Normal methods for measuring the non-linear effects in WDM transmission systems are based on determining a quality parameter such as the Q factor or the bit error rate (see "Optical Fiber Communications", IIIA, I. P. Kaminow, T. L. Koch, p. 316); for example, via a decision stage. This results in a criterion being determined for the signal quality and/or for the quality of all the channels in the signal.

One such measurement method is known from Patent Application DE 199 14 793 A1, which describes a method and an arrangement for measuring the signal quality in an optical transmission system. A received binary signal BS is sampled using different thresholds, and the sampling results are integrated and stored. The measured probability distribution and probability density distribution can be used to draw conclusions relating to the signal quality; for example, the bit error rate (Abstract). FIG. 13 in this reference illustrates a measurement arrangement for WDM signals, in which different quality parameters are determined for each channel in a WDM signal.

The following illustrations describe a number of variants of the process of measuring the quality of an optical transmitted WDM signal according to the prior art, whose characteristics are explained.

FIG. 1 shows a conventional implementation of a measurement device for determining the Q factor or the bit error rate BER of a WDM signal S transmitted via an optical fiber LWL. The measurement can be carried out at the end of the transmission path LWL and at a point in the transmission fiber LWL via an inputting device EE. The WDM signal S is fed into a wavelength division demultiplexer F, such as a tunable filter, so that all the channels are selectively separated. Each channel is then supplied to a receiver Rx for quality measurement. The receiver Rx produces, for example, the values of the Q factor Q or of the bit error rate BER for all the channels.

FIG. 2 shows an exemplary embodiment of a receiver Rx for determining the bit error rate BER and for deriving the Q factor Q, which can be done from this, for one channel. A channel signal K selected from a WDM signal is supplied to a decision stage ES1 with a fixed decision threshold V1. The channel signal K is also sampled, using a variable decision threshold V2, in a decision stage ES2 arranged in parallel with the decision stage ES1. The output signals from the decision stages ES1 and ES2 are supplied to a logic "exclusive OR" element XOR. Different logic states are determined at the output of the element XOR and are counted by an error counter EC. The count results for different threshold values are used to determine the associated Q factors Q or bit error rates BER for one channel. The Q factor also can be derived directly from any desired recorded amplitude histograms.

FIG. 3 shows the profile of the Q factor Q for two different transmission paths as a function of the variable decision threshold V2. Optimum sampling results in a high Q factor Q, such as Q>6.5, or a measured bit error rate BER which is as low as possible, such as BER<$10^{-10}$.

For transmission which is protected by an error correcting code FEC (forward error correction), the bit error rate BER can be established from the number of corrected bits. An exemplary embodiment with FEC is described in FIG. 1 in the prior Patent Application P 01103107.7.

Two different effects during the transmission of wavelength division multiplexed (WDM) signals via an optical fiber may be the governing factors for non-linear interference as the reason for interactions between the channels, so-called multiple channel interactions. These are the Kerr effect and the non-linear scattering process. The Kerr effect mainly causes four wave mixing (FWM) and/or cross phase modulation (XPM). The non-linear scattering process results in stimulated Raman scattering (SRS). These non-linear effects are described in detail in the reference "Fiber-Optic Communication Systems", G. P. Agrawal, $2^{nd}$ Edition, pp. 323–328. These multiple channel interactions occur, in particular, in the case of "Dense Wavelength Division Multiplex" (DWDM) transmission, because the channel separations are even less than in WDM systems. For optimum transmission, these effects must be measured and minimized for the Q factor Q to have a constant value, which is as high as possible, for all channels.

An object of the present invention is, thus, to specify a method for determining and distinguishing between multiple channel interactions, which are caused, in particular, by Kerr effects and scattering processes, during the transmission of a WDM signal.

SUMMARY OF THE INVENTION

According to the present invention, therefore, the multiple channel interactions are distinguished by determining and evaluating the spectral profile of the Q factor along the bandwidth of a WDM or DWDM signal. This is done by sampling all the channels in the WDM signal, in which case it is possible to determine an amplitude histogram for each channel, in order to calculate the Q factor. The correction statistics can be used for protected data signals.

A comparison, carried out via an evaluation, between the Q factor values of the channels at the boundary and in the center of the bandwidth provides a conclusion as to whether the governing factor causing multiple channel interactions is Kerr effects or a non-linear scattering process.

In the case of DWDM transmission with a large number of channels with narrow frequency separations, the determination of the Q factor can be restricted to a number of channels at the boundary or in the center of the bandwidth. If there are a large number of channels, it is worthwhile recording statistical variations in the measurement results.

If the measurement of the Q factor is being influenced by high dispersion, this is compensated for, first of all, in the same way as other interference effects.

The WDM system can be optimized on the basis of the measurements of the profile of the Q factor.

Additional features and advantages of the present invention are described in, and will be apparent from, the following Detailed Description of the Invention and the Figures.

DETAILED DESCRIPTION OF THE INVENTION

Figure 1:
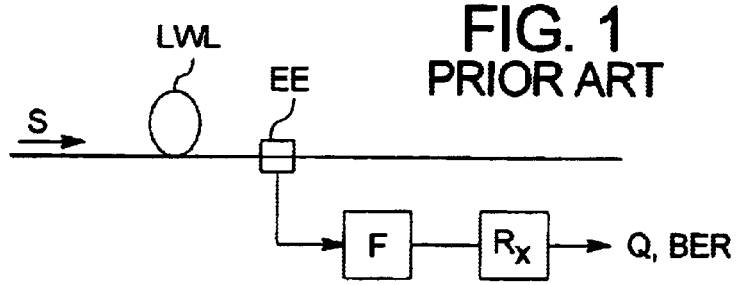
FIG. 1 shows one implementation of a measurement device of the prior art.
Figure 2:
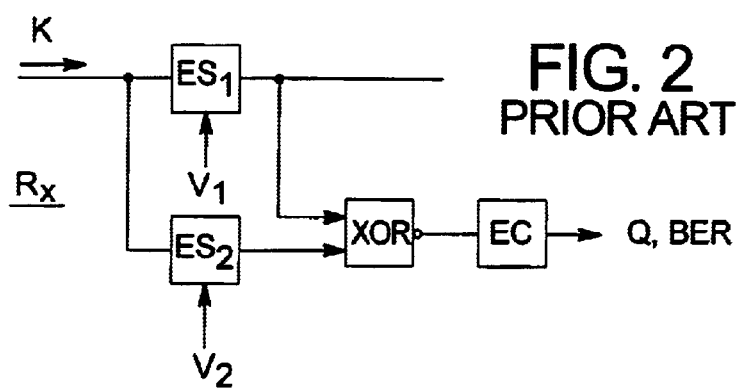
FIG. 2 shows an outline circuit diagram of a receiver with a variable decision threshold as is known in the prior art.
Figure 3:
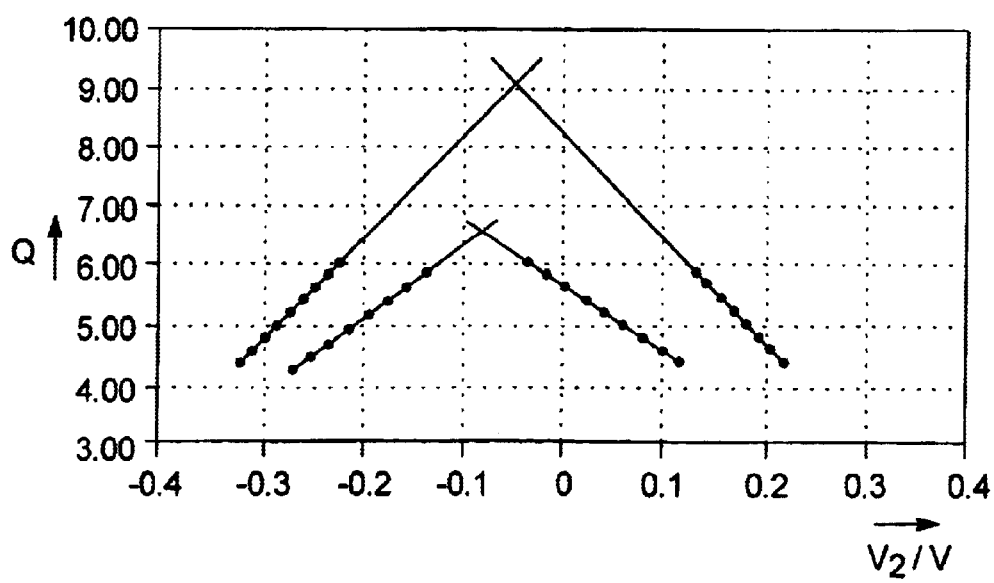
FIG. 3 shows a profile of the Q factor when the decision threshold is varied, for two different transmission paths, as is known in the prior art.
Figure 4:
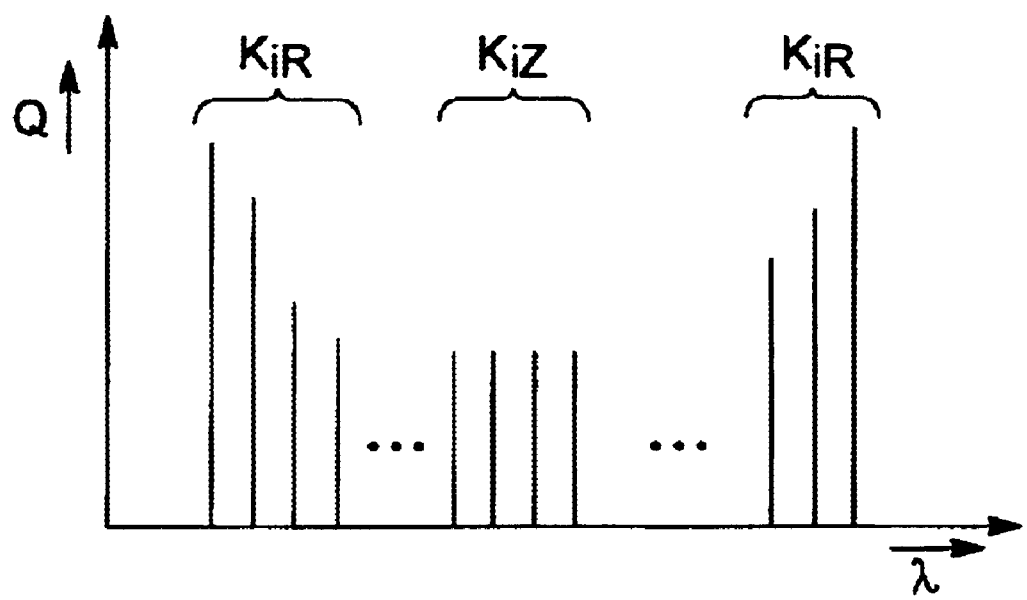
FIG. 4 shows a profile of the Q factor as a function of the wavelength for multiple channel interactions caused by Kerr effects FWM, XPM.

FIG. 4 shows the spectral profile SV of the Q factor for each channel, as caused by Kerr effects FWM, XPM. This profile has a lower Q factor Q in the center than at the boundary. This is because the transmission in the central channels $K_{1Z}$ is adversely affected by a number of adjacent channels. The channels at the boundary of the transmission band have fewer adjacent channels, so that the interference caused by Kerr effects is less. Boundary channels $K_{1R}$ thus have a better Q factor Q.

Figure 5:
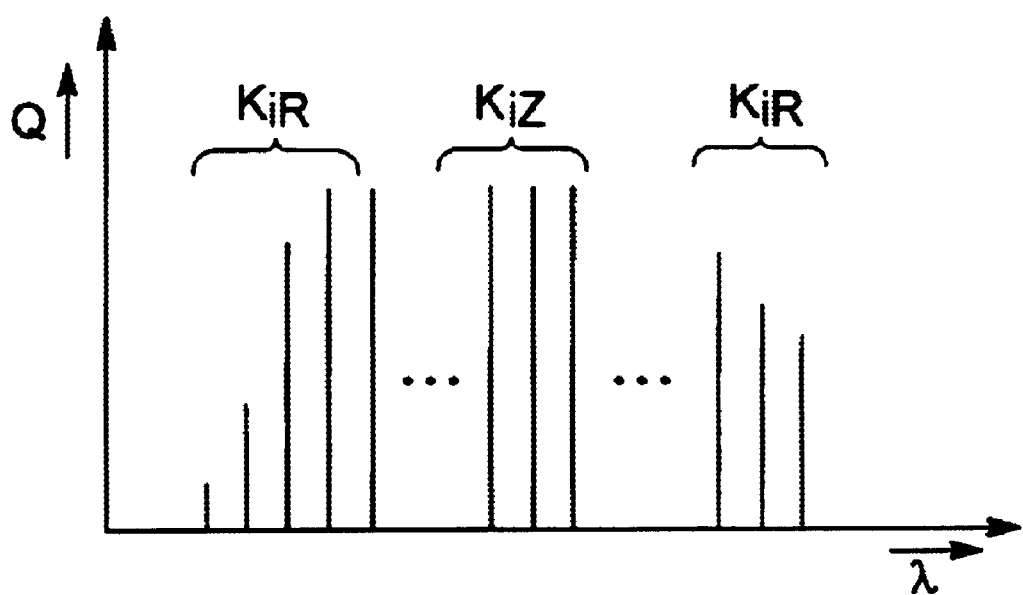
FIG. 5 shows a profile of the Q factor as a function of the wavelength for multiple channel interactions caused by a non-linear process SRS.

FIG. 5 shows the spectral profile SV of the Q factor Q for a non-linear scattering process, stimulated Raman scattering SRS. As is known, the Raman gain increases as the frequency differences between channels increase (see "Fiber-Optic Communication Systems", G. P. Agrawal, $2^{nd}$ Edition, p. 381). The Raman gain reaches a maximum at a frequency difference of about 13.2 GHz. The boundary channels $K_{1R}$, which have a greater frequency separation from the other channels, particularly from those on the other side of the transmission band, are affected to the greatest extent by interference from the non-linear scattering process SRS. Thus, in contrast to FIG. 4, the profile of the Q factor Q will have low values at the boundary of the transmission band.

Various methods may be used to determine the curve profile. By way of example, the Q factors Q in FIGS. 4 and 5 may be interpolated using a second-order polynomial, and the Q factors of the boundary channels $K_{1R}$ may be interpolated using straight lines. The differences between the polynomial and the straight lines are evaluated. It is, therefore, possible to determine the nature and magnitude of the interference effect in the multiple channel interactions.

The knowledge of the governing effects in multiple channel interactions allows further optimization of system parameters such as channel power or dispersion compensation, particularly in the case of DWDM transmission. This speeds up the optimization process during the installation of a transmission system. In addition, alarm signals can be provided, in order to signal different multiple channel interactions, for long-term monitoring of the transmission process.

Although the present invention has been described with reference to specific embodiments, those of skill in the art will recognize that changes may be made thereto without departing from the spirit and scope of the present invention as set forth in the hereafter appended claims.

What is claimed is:

1. A method for determining interactions between a number of optical channels in a wavelength division multiplexed signal, the optical channels including both boundary channels and central channels, the method comprising the steps of:

determining quality parameters for all the optical channels;

determining a spectral profile of the quality parameters; and evaluating the spectral profile of the quality parameters to distinguish between a Kerr effect and a non-linear scattering process as a reason for the interactions.

2. A method for determining interactions between a member of optical channels in a wavelength division multiplexed signal as claimed in claim 1, the method further comprising the step of determining an amplitude histogram for each of the optical channels from which a Q factor is calculated as the respective quality parameter.

3. A method for determining interactions between a member of optical channels in a wavelength division multiplexed signal as claimed in claim 1, the method further comprising the step of determining a bit error rate for each of the optical channels as the respective quality parameter.

4. A method for determining interactions between a number of optical channels in a wavelength division multiplexed signal as claimed in claim 1, the method further comprising the step of determining a bit error rate during data transmission protected by an error correcting code.

5. A method for determining interactions between a number of optical channels in a wavelength division multiplexed signal as claimed in claim 1, wherein the quality parameters are determined and evaluated only for some of the boundary channels and a plurality of the central channels.

6. A method for determining interactions between a number of optical channels in a wavelength division multiplexed signal as claimed in claim 2, wherein, if the values of the Q factor for the central channels are less than the values of the Q factor for the boundary channels, the Kerr effect is determined to be a governing effect and, if the values of the Q factor for the central channels are greater than the values of the Q factor for the boundary channels, the non-linear scattering process is determined to be the governing effect.

7. A method for determining interactions between a number of optical channels in a wavelength division multiplexed signal as claimed in claim 3, wherein, if the values of the bit error rate for the central channels are greater than the values of the bit error rate for the boundary channels, the Kerr effect is determined to be a governing effect and, if the values of the bit error rate for the central channels are less than the values of the bit error rate for the boundary channels, the non-linear scattering process is determined to be the governing effect.

8. A method for determining interactions between a number of optical channels in a wavelength division multiplexed signal as claimed in claim 2, wherein the Q factors for the individual optical channels in the wavelength division multiplexed signal are used to carry out different pre-emphasis in order to compensate for the Q factors.

9. A method for determining interactions between a number of optical channels in a wavelength division multiplexed signal as claimed in claim 3, wherein the bit error rate for the individual optical channels in the wavelength division multiplexed signal are used to carry out different pre-emphasis in order to compensate for the bit error rates.

10. A method for determining interactions between a number of optical channels in a wavelength division multiplexed signal as claimed in claim 1, wherein dispersion effects are minimized before any measurements are taken.

* * * * *